United States Patent [19]
Jeffers

[11] 3,798,658
[45] Mar. 19, 1974

[54] RECORDING DEVICE
[76] Inventor: Barney W. Jeffers, 831 Marywood Ave., Aurora, Ill. 60504
[22] Filed: May 10, 1973
[21] Appl. No.: 359,085

[52] U.S. Cl. .................... 346/131, 177/2, 346/137, 346/143
[51] Int. Cl. ........................................... G01d 9/12
[58] Field of Search .......... 346/121, 131, 137, 143, 346/112, 49, 102; 177/2

[56] References Cited
UNITED STATES PATENTS
483,722 10/1892 Lewis............................ 346/121 X
1,923,793 8/1933 Niederhauser............... 346/143 UX
3,268,909 8/1966 Green.................................. 346/111

Primary Examiner—Joseph W. Hartary
Attorney, Agent, or Firm—Edmond T. Patnaude

[57] ABSTRACT

A recording device for making a permanent record of a manually entered variables versus time includes a single toothed lever driven by an electric motor in an orbital path for intermittent engagement with an internal ring gear on a chart carrying platen. Manually movable marking means for entering the variables are carried by a transparent cover hingedly mounted over the chart.

7 Claims, 5 Drawing Figures

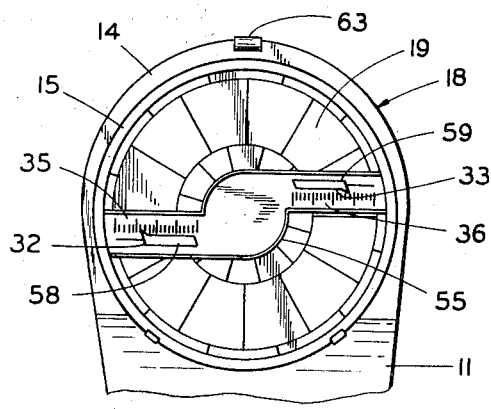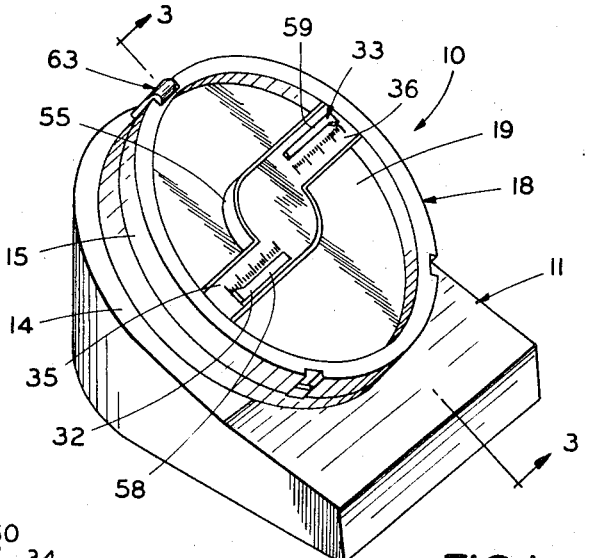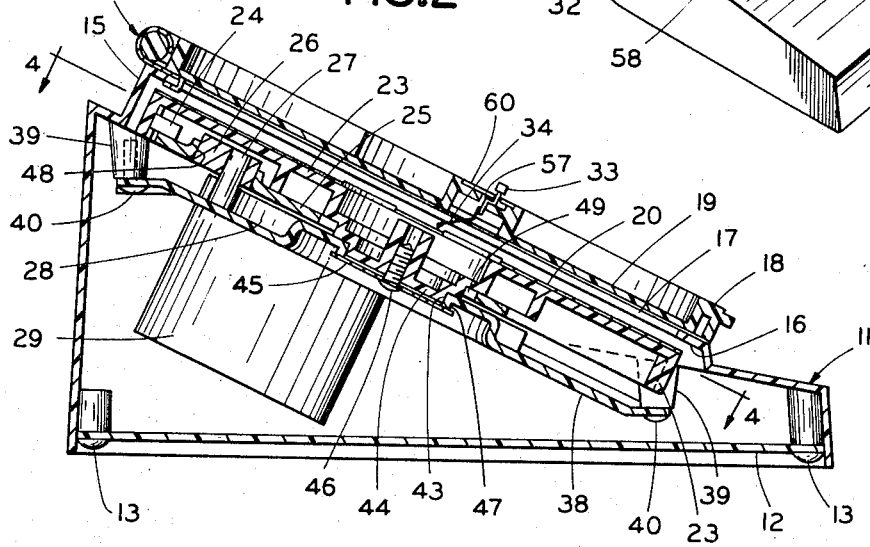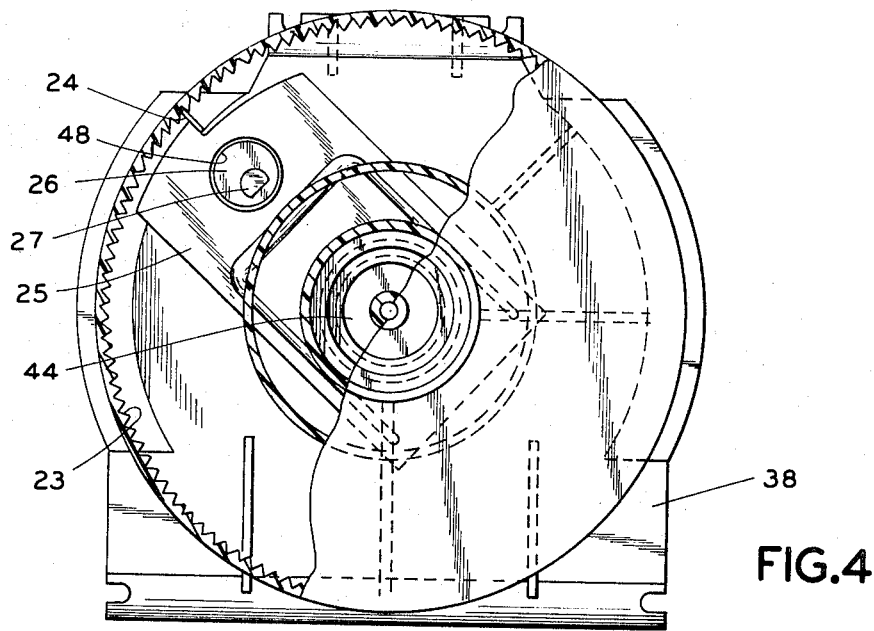

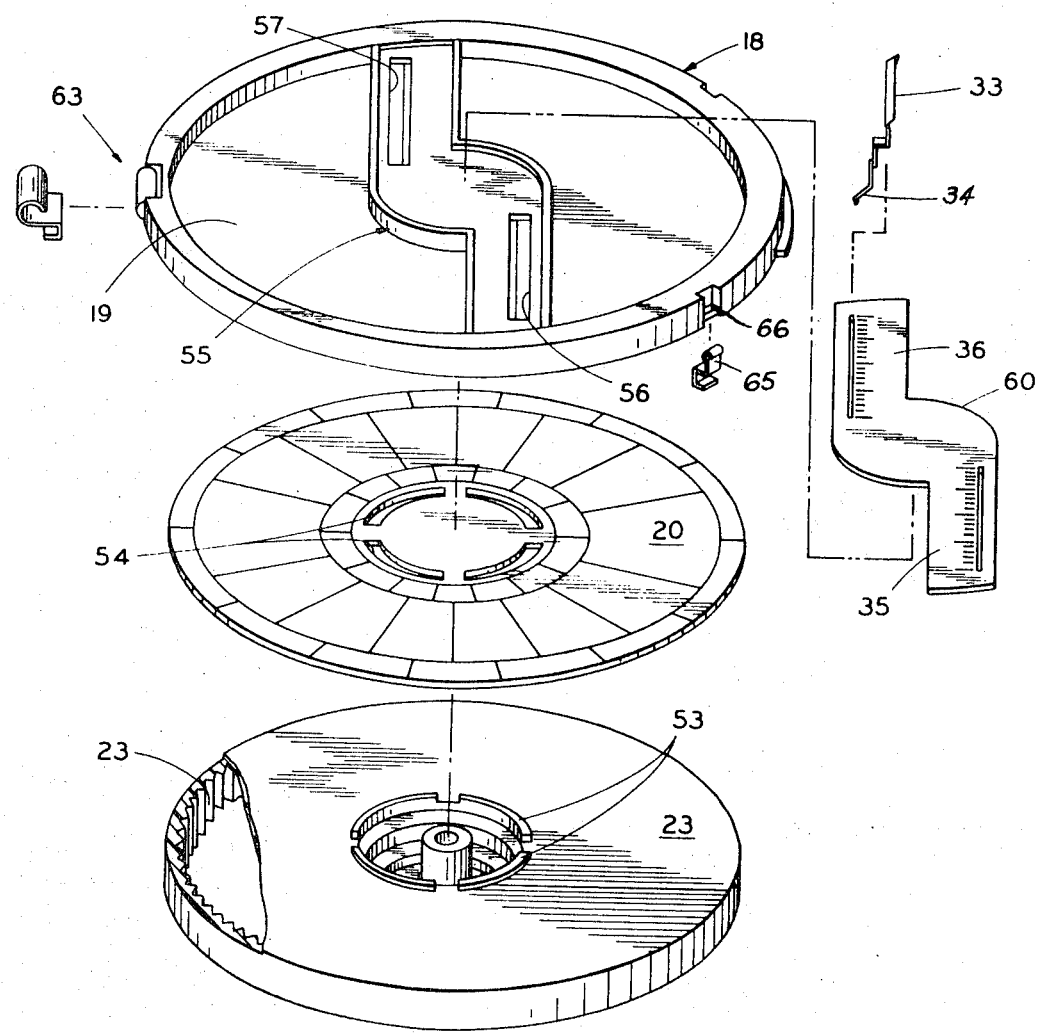
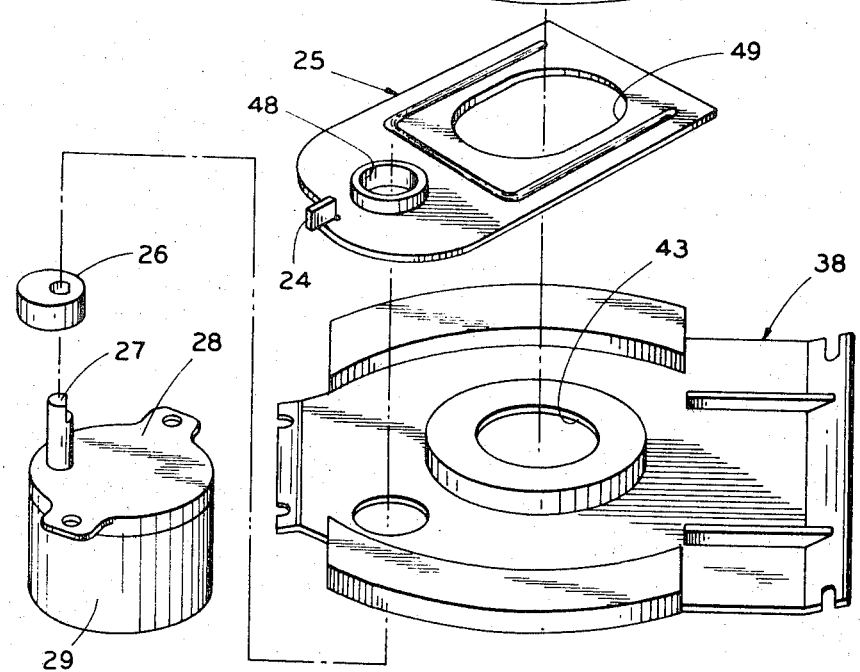
FIG.5

RECORDING DEVICE

The present invention relates in general to recording devices, and it relates more particularly to a new and improved recorder suitable for charting the day-to-day changes in a person's weight.

BACKGROUND OF THE INVENTION

Recording instruments which incorporate a motor driven circular chart and one or more marking pens or styli have been widely used in industrial, medical, and laboratory applications. Such instruments are generally large in size, delicate in operation and expensive to manufacture. Consequently, they are not suitable for use in the home or other places where they are subject to rough handling and must be operated and maintained by persons with little ability in the use of such equipment. There is, however, a need for a small durable, inexpensive recorder in the home. One important use of such a recorder would be to provide a visible, daily record of an individual's weight. Many persons on weight controlling diets find it desirable, if not necessary, to keep a daily record of their weight and such a recorder would greatly facilitate this.

OBJECTS OF THE INVENTION

Therefore, a principal object of the present invention is to provide a new and improved recording device which may be used in the home by persons who are unskilled in the use and maintenance of recording instruments.

Another object of this invention is to provide a recording device which is simple in design, compact and durable in construction and which can be manufactured at a relatively low cost.

A further object of this invention is to provide a recording device having a new and improved means for rotating a record chart relative to one or more manually adjustable marking pens.

SUMMARY OF THE INVENTION

Briefly, the above and further objects may be realized in accordance with the present invention by providing a housing base in which a motor drive unit and chart carrying platen are mounted, and a transparent cover hingedly mounted over the platen and carrying one or more manually movable recording pens. Opening of the cover thus provides access to the platen for changing the chart and also provides immediate access to the marking pens. The motor drive unit includes a single toothed drive lever which travels in a orbital path to intermittently engage an internal ring gear on the platen to advance the platen one tooth width during each complete orbit of the lever.

BRIEF DESCRIPTION OF THE DRAWINGS

The above and further objects and a better understanding of the invention may be had from the following detailed description taken in connection with the accompanying drawings, wherein:

FIG. 1 is a perspective view of a recording device embodying the present invention;

FIG. 2 is a fragmentary top view of the recorder of FIG. 1;

FIG. 3 is a vertical section of the recorder of FIG. 1 taken along the line 3—3 thereof;

FIG. 4 is a partially sectioned view taken along the line 4—4 of FIG. 3; and

FIG. 5 is an exploded perspective view of the operative parts of the recorder of FIG. 1.

DETAILED DESCRIPTION OF THE INVENTION

Referring now to the drawings, a recorder 10 comprises a housing base 11 suitably molded of plastic and a bottom cover plate 12 removably secured thereto by a plurality of screw type fasteners 13. The top face 14 of the base slants upwardly toward the rear and includes an upstanding tubular portion 15 having an internal annular flange 16 at the top defining a circular opening 17. A cover 18 is mounted over the opening 17 and has a transparent, generally circular central portion 19 through which a circular record chart 20 may be seen.

As best shown in FIGS. 3 and 5, the chart 20 is carried by a circular platen 23 having an internal ring gear 24 depending therefrom for intermittent engagement by a drive tooth 24 on a lever 25 driven in an orbital path by an eccentric cam 26. The cam 26 is cylindrical and is eccentrically mounted on an output shaft 27 of a gear reduction unit 28 mounted to a constant speed a.c. motor 29. Preferably, and as more fully described hereinafter the cam 26 is rotated at a speed of one revolution per day and once each day drives the platen through an angle equal to the angular spacing between the teeth on the ring gear 23.

A pair of adjustable marking units 32 and 33 are slidably carried by the cover 18 and each marking unit includes a pen or stylus 34 which is inherently resilient and presses against the chart 20 when the cover 18 is in a closed position as illustrated in FIGS. 1 and 3. The marking units 32 and 33 are each manually movable in generally radial directions relative to the chart 20 to radially position the pens 34 relative to the chart. Two sets of graduated scales 35 and 36 are provided on the cover adjacent the marking units for facilitating proper positioning thereof. Where, for example, the recorder 10 is to be used for recording weight, the scales 35 and 36 are graduated in pounds and one marking unit may be used by one person and the other marking unit by another person. The pens 34 may carry ink of different colors to facilitate distinguishing between the two records. A ring gear 23 having 126 teeth provides a four month record and a chart 4 inches in diameter provides an easily readable record.

Considering the recorder 10 in greater detail, a mounting plate 38 is secured to a plurality of depending bosses 39 on the housing base by a plurality of screw type fasteners 40 and includes central, circular opening 43 rotatably receiving the depending hub portion 44 of the platen 23. A spring washer 45 is secured to the platen 18 by a screw type fastener 46 and is resiliently biased near its perimeter against a depending annular flange 47 on the mounting plate 38 to prevent spurious rotation of the platen. The motor 29 and associated gear reduction unit 28 are mounted to the underside of the mounting plate 38 with the cam 26 extending upwardly into a circular opening 48 in the lever 25. As best shown in FIG. 5, the lever 25 has an elongated longitudinal slot 49 surrounding a circular hub portion 50 on the platen 23 to permit the lever to rotate and slide back and forth on the hub portion 50 as it is driven in an orbital path by the cam 26. The drive tooth 24 is integral with the lever and extends upwardly and outwardly from the main body portion thereof for driving engagement with the gear 23 during a portion of its orbital path. Consequently, the platen is intermittently rotated through the angular distance of one gear tooth during each complete orbit of the lever 25.

Referring to FIG. 5, it may be seen that the platen 20 has a plurality of upstanding arcuate segments 53 receivable in a plurality of corresponding arcuate slots 54 in the chart 20 thereby to prevent relative angular movement between the chart and the platen.

The top cover 18 is generally circular in shape and rests on the flange 16 surrounding the opening 17 in the top of the housing base. The central portion 19 of the cover 18 is recessed to be in proximity to the chart 20, and a raised armlike portion 55 extends across the cover and is provided with slots 56 and 57 through which the marking units 32 and 33 respectively extend. Elongated, finger gripping slides 58 and 59 are provided as part of the marking units. The crossarm portion 55 is recessed at the top to receive a cover plate or strip 60 which holds the marking units in assembled relationship with the cover and on which the graduated scales 35 and 36 are provided. A hinge assembly 63 pivotally connects the top of the cover 18 to the rear upstanding flange portion of the base housing to permit opening of the cover to change charts and marking pens and to urge the cover 18 into a closed position with the pens engaging the chart. A pair of spring clips 65 are mounted to the base and snap over correspondingly located shoulders 66 on the cover 18 to hold the cover tightly against the base flange 16 and to hold the marking pens 34 against the chart 20.

OPERATION

In use, the cover 18 is swung open and a chart 20 is placed on the platen 23 with the segments 53 extending into the slots 54. The pens 34, which may be ball pens or the like having associated ink reservoirs preferably containing different colored inks, are then moved against the chart by simply closing the cover 18 which snaps in place. The slides 58 and 59 may then be positioned relative to the graduations 35 and 36 to enter the initial data into the recorder. An electric cord and plug (not shown) are then connected to a 110 volt A.C. outlet to energize the motor 29. Each day, or when otherwise appropriate, the slides 58 and 59 are reset to enter new data into the recorder. After four months the cover is opened to replace the chart and the procedure described above is repeated. During the four month period the chart may be viewed through the window portion 19 of the cover whereby the cover 18 need not be opened to see how the data is progressing.

The present invention thus provides an inexpensive, easily used recorder adapted for use in the home by persons untrained in the use and maintenance of recording instruments. The novel platen drive mechanism is simple in construction and is readily accessible by removal of the bottom cover plate 12.

While the present invention has been described in connection with a particular embodiment thereof, it will be understood that those skilled in the art may make many changes and modifications without departing from the spirit and scope thereof. Accordingly, the appended claims are intended to cover all such changes and modifications as fall within the true spirit and scope of the present invention.

What is claimed is:

1. A recording device for charting a variable relative to time, the combination comprising
 a base,
 motor means carried by said base,
 a circular platen for receiving a circular chart,
 said platen being rotatably mounted to said base,
 an internal ring gear carried by said platen,
 a drive lever mounted for orbital movement by said base and having a drive tooth at the outer end for operative engagement with said ring gear during a portion of the orbital movement of said drive tooth,
 an eccentric cam driven by said motor and connected to said lever for driving said lever along said orbital path for rotating said gear through a predetermined angle for each orbit of said lever,
 a transparent cover member removably connected to said base over said platen, and
 marking means carried by said cover for engagement with said chart when said cover is in a closed position, and movable in a generally radial direction relative to said platen for inscribing a visible mark on said chart.

2. A recording device according to claim 1, further comprising
 a second marking means also carried by said cover and movable in a generally radial direction relative to said platen for inscribing a second visible mark on said chart.

3. A recording device according to claim 1, comprising
 a circular hub on said platen,
 said lever having an elongated slot slidably and rotatably disposed over said hub, and
 said lever having a hole therein receiving said cam,
 and said hole being radially displaced from said slot.

4. A recording device according to claim 3, wherein
 said cam and said hole are circular and
 said cam is drivingly connected to said motor means by a shaft eccentrically connected to said cam.

5. A recording device according to claim 4, wherein said motor means comprises
 an electric motor, and
 a step-down gear train.

6. A recording device according to claim 1, wherein said cover is hingedly connected to said base.

7. A recording device according to claim 1, wherein said cover is provided with graduations adjacent said marking means for facilitating the manual positioning of said marking means.

* * * * *